United States Patent [19]

Spindel et al.

[11] 4,176,338
[45] Nov. 27, 1979

[54] HIGH RESOLUTION ACOUSTIC NAVIGATION SYSTEM

[75] Inventors: Robert C. Spindel, North Falmouth; Robert P. Porter, West Falmouth; William M. Marquet, Falmouth, all of Mass.

[73] Assignee: Woods Hole Oceanographic Institution, Woods Hole, Mass.

[21] Appl. No.: 829,344

[22] Filed: Aug. 31, 1977

[51] Int. Cl.$^2$ .............................................. G01S 5/18
[52] U.S. Cl. ........................................ 367/6 E; 367/3
[58] Field of Search ...................... 340/3 D, 3 E, 6 R

[56] References Cited

U.S. PATENT DOCUMENTS

| 3,421,138 | 1/1969 | Moulin et al. | 340/3 E |
| 3,860,900 | 1/1975 | Scudder | 340/3 E |
| 3,928,840 | 12/1975 | Spindel et al. | 340/3 D |
| 4,017,823 | 4/1977 | Cooke et al. | 340/3 D |

OTHER PUBLICATIONS

Ragland, Ocean Science and Ocean Eng., Marine Tech. Soc., Amer. Soc. Limnol. Oceanogr., vol. 2, 1965, pp. 1145-1161.
Mourad et al., EOS Trans. Am. Geophysics Union, No. 53, 1972, pp. 644-649.

Primary Examiner—Richard A. Farley
Attorney, Agent, or Firm—Diller, Ramik & Wight

[57] ABSTRACT

A high resolution underwater acoustic navigation system is provided by a combined pulse and continuous-wave or Doppler system. Locations of the object being tracked are periodically determined by the pulse subsystem and are used to initialize the Doppler subsystem. The Doppler Subsystem tracks the location from the fix obtained by the pulse subsystem. Both subsystems are interfaced with a central processing unit or digital computer and the data rate input to the computer is substantially reduced by the use, in the Doppler subsystem, of a phase angle quadrant change counter whose accumulated count is periodically provided as an input to the computer.

10 Claims, 3 Drawing Figures

HIGH RESOLUTION ACOUSTIC NAVIGATION SYSTEM

The Government has rights in this invention pursuant to Contract No. N00014-70-C-0205 awarded by the Office of Naval Research.

BACKGROUND OF THE INVENTION

Current methods of locating or tracking the position of a ship, submersibles, buoys or submerged instruments in the ocean can be broadly divided into two types. The first type employs electromagnetic transmission from a shore station, marker buoy or satellite. Such systems operate at long ranges and are limited in accuracy to about 100-200 m at best. Furthermore, these systems require above-surface antennas and are therefore of little use in positioning entirely submerged devices. The second type employs acoustic transmission from a set of transponders or beacons, usually moored to the ocean bottom, whose relative positions are precisely known.

The acoustic systems currently in use are pulse systems and continuous wave or Doppler systems. The pulse systems operate on the round trip transit times of tone bursts and are employed to compute the slant range from the object being tracked to the various underwater devices and based upon which the position of the object is determined. Currently, the pulse type of system is capable of determining object position with errors in the order of 2-3 m in 5 km water depth.

In the Doppler type of system or continuous wave system, the underwater devices continuously transmit acoustic tones of known frequency and the Doppler shift components of these tones as received at the object being tracked and these components are employed to determine the position of the object with respect to the bottom-moored reference net of underwater devices. Currently, systems operated in a continuous wave or Doppler mode can approach accuracies in the order of 3-4 cm.

BRIEF SUMMARY OF THE INVENTION

The present invention relates to an underwater acoustic navigation system which is characterized by high resolution which operates periodically in a pulse mode and continuously in a Doppler mode. In the pulse mode, a transducer on board the object being tracked transmits a tone burst or interrogation pulse which is received by three transponders moored near the ocean bottom. Each transponder emits a pulse at a different frequency which is received on board the object and the three round trip travel times are processed by an on board computer which produces a position estimate. Typically, an independent fix or position is available every 30 seconds in deep water. Three continuous tone beacons located on the same moorings described above transmit highly stable tones, each identified by its characteristic frequency. These tones are received at the object and the Doppler frequency offsets of the beacon tones are measured by an accurate counter. Estimates of the Doppler shift for each of the three beacons are read every ½ second and since the frequency shifts are proportional to platform speed along the lines between the beacons and the object, the position of the object relative to an earlier fix or position is computed.

A computer subsystem controls the inflow of data from the pulse and Doppler systems, time shares the navigation calculation, and controls the data outflow to various data loggers. Real time operation is possible with a 32 K word central processing unit operated with a movable head disc. Computation routines for the pulse and Doppler systems are segmented and, consequently must be interchanged between the central processing unit and the disc.

The Doppler receiving system according to the present invention employs a unique quarter wave counter system. Each channel of the Doppler receiver system is provided with a coherent demodulator which produces sine and cosine outputs at the Doppler shift frequency. These outputs are fed to a quadrant detection system which operates on the instantaneous positive and/or negative values of the sine and cosine inputs thereto to determine the quadrant. For example, a positive sine and positive cosine indicates quadrant 1; positive sine and negative cosine indicates quadrant 2, etc. The system employs a quadrant change detector system which clocks a counter to accumulate the number of quadrant changes. These counts accumulate for a predetermined short period of time and are then read into a computer or central processing unit. Real time operation of the combined pulse and Doppler system of this invention is possible because the sampling rate is within the capability of computers currently used.

The quadrature components of the Doppler shift components of each channel are applied to low pass filters having narrow band widths, in the order of 10 Hz and so provide an output signal-to-noise level in the order of 20-30 dB. This bandwidth permits detection of velocities less than 1.2 mps along the line between the beacons and the object being tracked, large enough to track the vehicles with which the invention is contemplated.

BRIEF DESCRIPTION OF THE DRAWING FIGURES

DETAILED DESCRIPTION OF THE INVENTION

Figure 1:
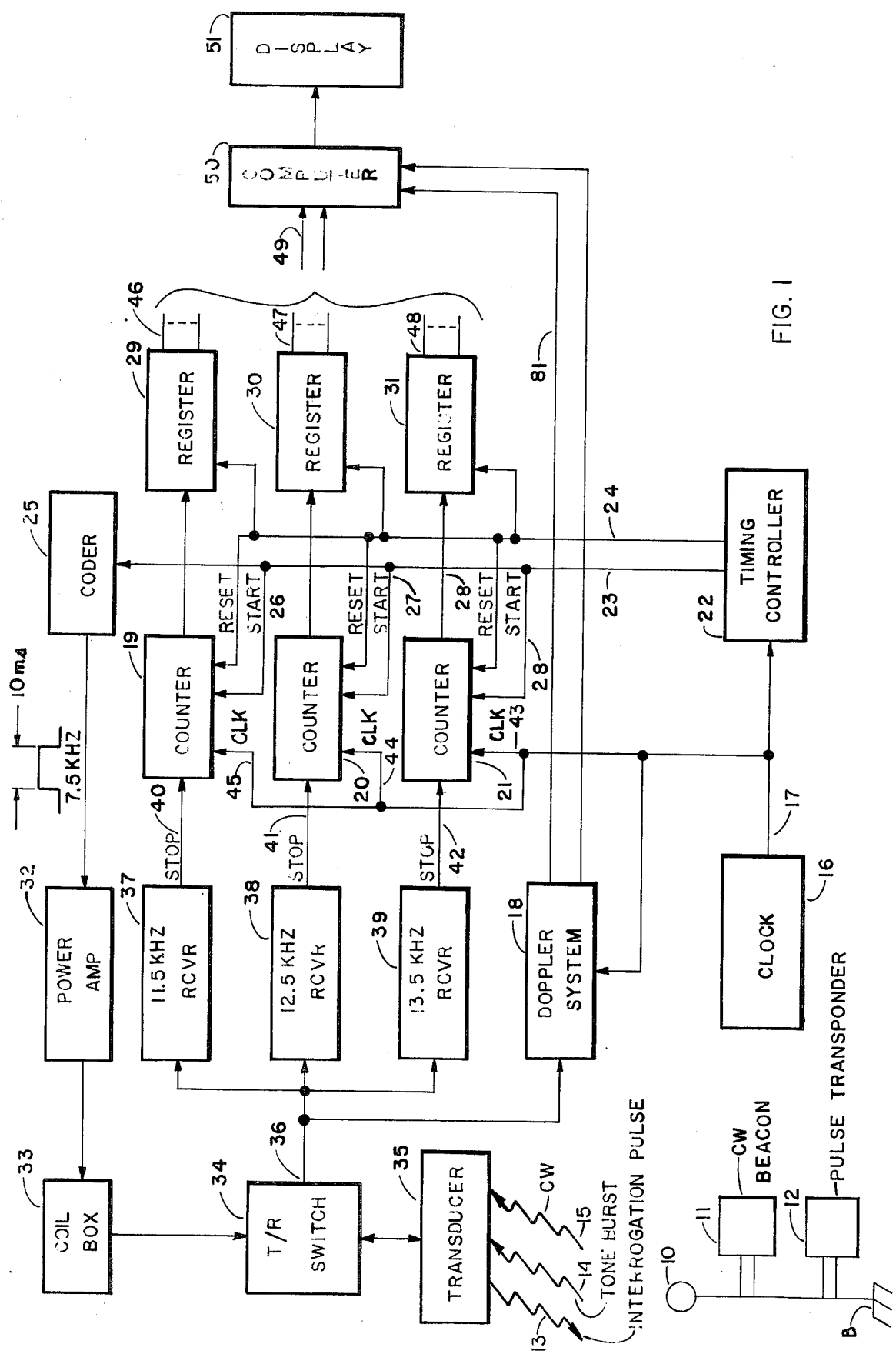
FIG. 1 is a diagrammatic view illustrating the system according to the present invention.

Referring to FIG. 1, the reference character 10 therein indicates an underwater device which is tethered or moored to the bottom B as indicated and which underwater device comprises one of a plurality, preferably three such devices moored to the bottom at geographically known and fixed positions. Each of the devices 10 carries a continuous wave beacon 11 and, as well, a pulse transponder 12. The remainder of the system illustrated in FIG. 1 is carried on board the object or platform being tracked.

The pulse transponder 12 at each underwater location transmits an acoustic tone burst in response to reception of periodically transmitted interrogation tone bursts or pulses as indicated at 13, the transponder tone bursts being indicated at 14. The underwater beacon 11 at each of the underwater devices 10 continuously transmits an acoustic tone of a characteristic frequency and these continuous tones are received at the object being tracked as indicated by the reference character 15.

The system on board the object being tracked includes a master clock 16 having an output at 17 which is applied to the Doppler system 18, to the counters 19, 20 and 21 and to the timing controller 22. The timing controller has two outputs at 23 and 24, the former of which is connected to the coder 25 and also at lines 26, 27 and 28 to the respective counters 19, 20 and 21. The output 24 is applied to the registers 29, 30 and 31. The output at 23 initiates a cycle of operation for the pulse system. The signal to the coder 25 instructs same to produce a pulse output of 10 ms duration at a frequency of 7.5 kHz which is suitably amplified at 32 and is passed through the coil box 33 and the transmit/receive switch 34 to the transducer 35 for transmission of the interrogation pulse 13. There are preferably at least three of the underwater devices 10 and each of the pulse transponders 12 thereof receives the interrogation pulse and responds with an acoustic tone burst as indicated by the reference character 14 at the characteristic frequency of the underwater device 10. Typically, the three underwater devices 10 may respond at frequencies of 11.5, 12.5 and 13.5 kHz. The transducer 35 receives these three return pulses and they are passed through the switch 34 over the line 36 and applied to the three receivers 37, 38 and 39. At the times of the receptions of the return signals in the three receiver channels, the individual channels provide stop signals at the respective lines 40, 41 and 42 which stop the respective counters 19, 20 and 21.

At this point, it will be appreciated that at the beginning of the pulse cycle, the counters 19, 20 and 21 have been enabled to start counting the clock pulses applied thereto over the lines 43, 44 and 45 so that the respective counts accumulated therein represent the round trip travel time. At the end of the pulse cycle, the timing controller 22 produces the output signal at 24 which resets the counters 19, 20 and 21 and shifts out the accumulated counts in the buffer stores or registers 29, 30 and 31 over the lines 46, 47 and 48 which are connected through the bus 49 to the computer 50. These round trip travel times are utilized by the computer 50 or central processing unit to calculate the slant ranges to the various underwater devices 10 and determine the position of the platform or object being tracked therefrom. A conventional display device 51 is controlled by the computer output to indicate the position.

It will be understood that the system thus far described in entirely conventional in nature, most components of which are available commercially from AMF Sea Link, Alexandria, Va.

Figure 2:
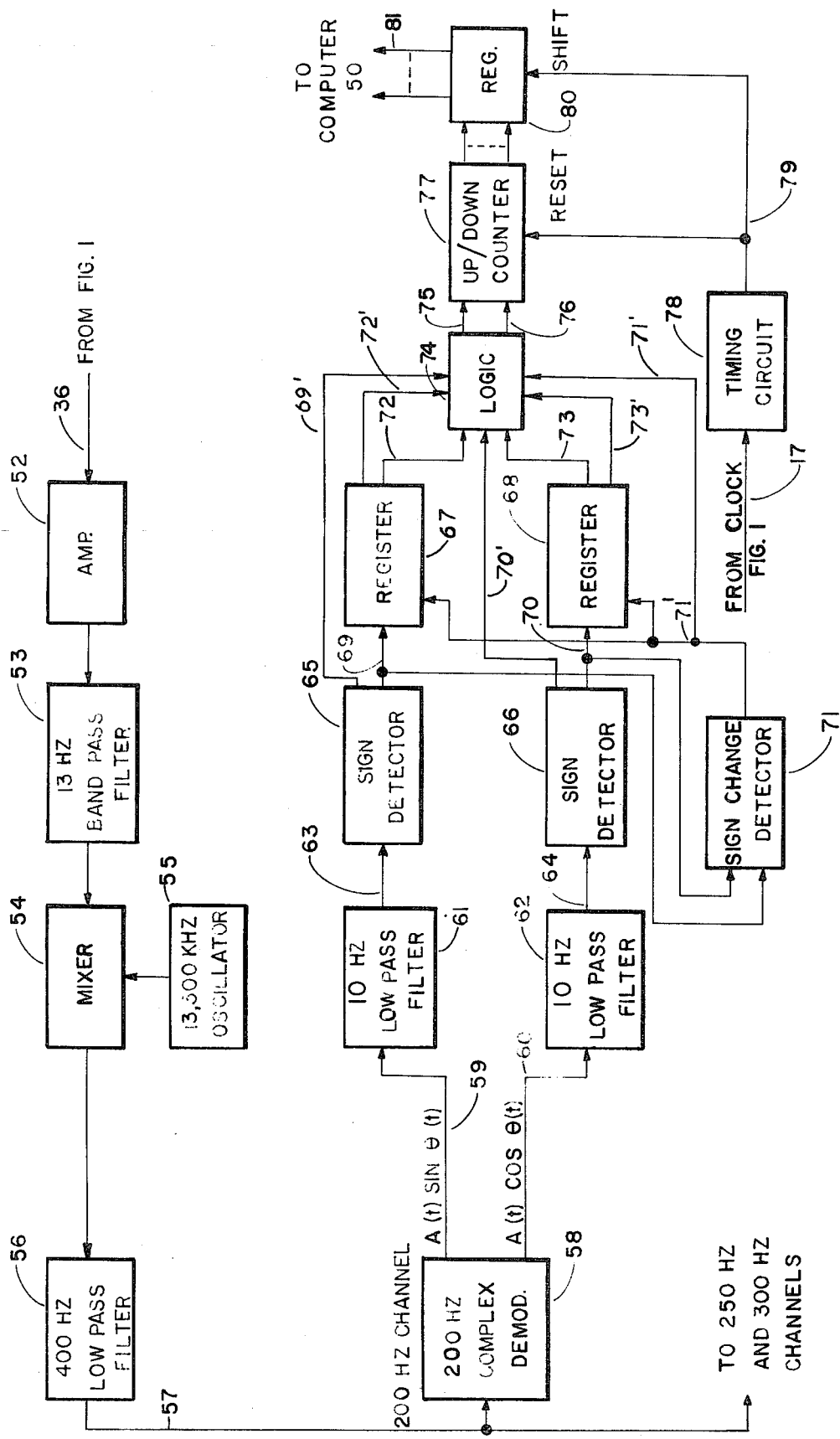
FIG. 2 is a diagrammatic view illustrating principles of the Doppler system according to the present invention as well as the quadrant detection system.
Figure 3:
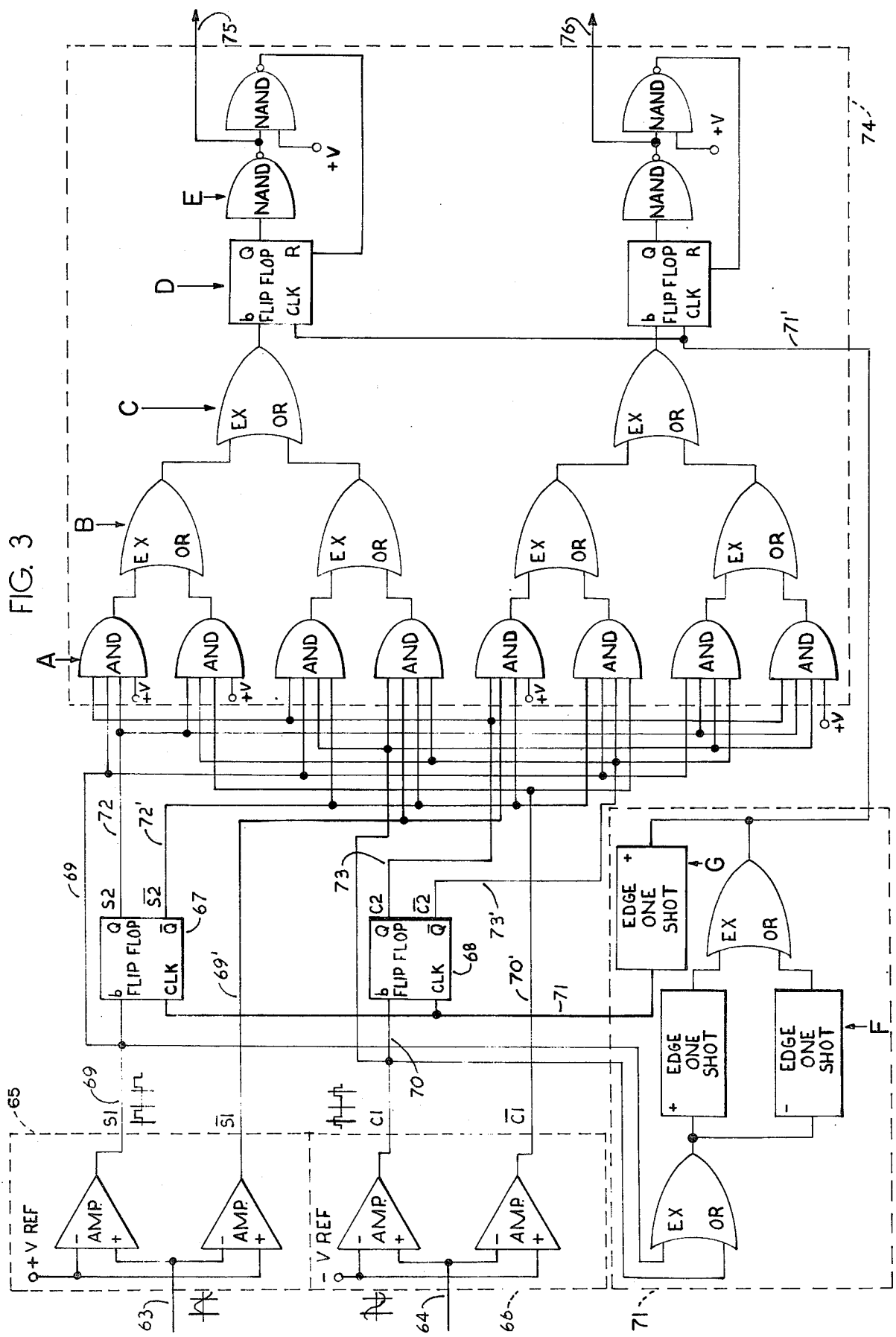
FIG. 3 is a schematic of certan logic circuitry illustrated in FIG. 2.

The Doppler system indicated generally by the reference character 18 in FIG. 1 is shown in greater detail in FIG. 2 and in FIG. 3. Having reference to these latter Figures, the continuous tones transmitted by the beacons 11 of the underwater devices 10 are received by the transducer 35 and are passed by the transmit/receive switch 34 to the line 36. The beacons 11 may transmit for example, at characteristic frequencies of 13,000 Hz, 13,050 Hz and 13,100 Hz respectively. In the receiver system, these signals are first amplified by the amplifier 52 and then passed through the 13 kHz bandpass filter 53 to the mixer 54. The local oscillator 55 provides a highly stable 13,300 Hz input to the mixer 54 and the output of the mixer 54 is then passed through the low pass filter 56. The filter 56 passes frequencies below 400 Hz so that at its output 57 there appears the Doppler-shifted signals which are the difference between the frequency of the local oscillator 55 and the frequencies of the beacons 11 as received by the transducer 35 in FIG. 1.

The Doppler subsystem contains a channel for each of the underwater devices 11 but only one channel is shown in FIG. 2. The channel chosen for illustration is that corresponding to the beacon 11 which transmits at a frequency of 13,100 Hz. The complex demodulator or coherent phase demodulator 58 is tuned to the 200 Hz signal. The outputs of the demodulator 58 are the phase quadrature components of the 200 Hz signal as indicated at the conductors 59 and 60 and these two signals are passed through the respective low pass filters 61 and 62 to provide the respective sine and cosine outputs at 63 and 64. The sign detectors 65 and 66 shown in FIGS. 2 and 3 are essentially threshold circuits producing positive or negative output pulses when positive or negative threshold limits $+$VREF and $-$VREF are exceeded by the respective sine and cosine signals at 63 and 64. These pulse outputs are applied to the registers 67 and 68 respectively over the conductors 69 and 70. In addition to being applied as inputs to the registers 67 and 68, the two signals at 69 and 70 are applied to the sign change detector 71 which detects when either one of the two signals at 69 or 70 changes sign and when a sign change does occur, the detector provides an output signal at 71' which is applied to the two registers 67 and 68 which shifts out the previous condition of the signals 69 and 70 over the conductors 72 and 73 to the logic circuitry 74. The logic circuitry 74 is utilized for the direction of the motion indicated by the Doppler shift. Specifically, if the sign change at the inputs 69 and 70 is due to a change in quadrants in the forward direction, the logic circuitry 74 produces an output at 75 to cause the counter 77 to increase its count by one. On the other hand, if the sign change is due to a change in quadrants in the opposite direction, the output 76 of the logic circuitry 74 causes the count in the counter 77 to decrease by one.

As is shown in FIG. 3, a bank of AND gates A is provided for comparing current sine and cosine information S1, $\overline{S1}$, C1 and $\overline{C1}$ with the previous sine and cosine information S2, $\overline{S2}$, C2 and $\overline{C2}$. Thus, the uppermost AND gate receives and AND's S1, S2 and C2; the next gate receives and AND's S2, $\overline{C2}$ and $\overline{C1}$; the next gate receives C2, S1, C1 and $\overline{S2}$; and so on for the various combinations of current and previous sine and cosine information to identify, unambiguously, whether a quadrant increment or decrement has occurred. These possible combinations are grouped such that one or the other, but not both, of the two EXCLUSIVE OR gates C will produce an output. Thus, the AND gates A are grouped, two to an EXCLUSIVE OR gage B, such that one and only one gate C will receive a valid input in response to each change in the current sine and cosine information. Thus, when the new and old quadrants are compared upon each quadrant change, one of the two registers D will receive a positive input dependent upon whether the change was from quadrant II to quadrant III or from II to I (for example). The sign detector 71 detects the quadrant change and after a first delay provided by the one-shots F (to allow the logic 74 to settle down) clocks the quadrant change information into the appropriate one of the registers D. The first NAND gate of each pair E outputs the information to the counter 77 over line 75 or 76 whereas the second NAND gate resets the relevant register D. The detector, after a second delay provided by the one-shot G, clocks the current sine and cosine information into registers 67 and 78 so that their outputs will be the "previous" information when the next quadrant change occurs.

The timing circuitry 78 receives the input 17 from the clock 16 of FIG. 1 and produces, every T seconds, an output at 79 which resets the up/down counter 77 and causes the buffer or storage register 80 to shift out the current count of the counter 77 over the line 81 to the computer.

The bandwidth of the filters 61 and 62 determine the maximum velocity of motion along the beacon-to-object vector that can be measured. In the specific example shown, these filters have a bandwidth of 10 Hz so that the maximum velocity is equal to (filter bandwidth) $c/f_b$, where c is the speed of sound in water and $f_b$ is the beacon frequency, in which case the maximum velocity is 1.15 mps.

The rate of transfer of counts from the up/down counter 77 to the digital computer or central processing unit 50 determines the maximum frequency of motion that may be observed. For the case of T=0.1 second, the maximum frequency is $\frac{1}{2}T=5$ Hz. For the maximum quadrant count accumulation for T=100 seconds, a 12 bit counter (i.e. having a capacity of 4096) is required.

The navigation system according to the present invention operates such that an initial position of the tracked object relative to the known locations of the three reference moorings is obtained from the pulse portion of the system and the position so obtained is used as the initial position for subsequent tracking during the Doppler mode of operation. Thus, all tracking is automatic and tracking information can be easily stored and displayed using the various peripheral devices with which digital computers are commonly equipped. Position information is usually provided in a three dimensional Cartesian coordinate frame referenced to the position of one of the reference element moorings. The central processing unit is programmed to perform the required pulse triangulation and Doppler tracking algorithms.

The overall accuracy of the position of the tracked object computed by the system depends on a knowledge of the reference mooring locations and it is therefore of concern in connection with navigational systems of the type contemplated herein that the reference mooring locations be determined as accurately as possible. These locations are determined by acoustic surveys. Conventional surveys of acoustic transponders generally fall into two categories, the baseline-crossing and iterative techniques. The baseline-crossing technique is often referred to as the conventional or classic transponder survey method. This method requires that the transponder depths be previously determined from independent measurements. The baseline length (horizontal distance between two transponders) is estimated by steaming across a baseline and measuring the slant range to the two transponders. This requires accurate ship positioning and large amounts of ship time to yield accurate results.

It is known that for three bottom transponders and six coplanar survey positions with known depth, the positions and depths of the transponders can be found by solving six linear equations. A unique solution exists when the survey position s do not lie on a conic section. When more than six survey positions are used, the additional equations result in an over-determined situation for which minimum least squared error techniques have been successfully applied, see A. G. Mourad, D. M. Fubara, A. T. Hopper, and G. Y. Ruck, "Geodetic Location of Acoustic Ocean-Bottom Transponders From Surface Positions," EOS, Trans. Am. Geophysics Union, 53, 644–649, 1972.

With the present invention, the survey technique devised by Durham et al may be utilized, see J. L. Durham, R. C. Spindel, and R. P. Porter, "Survey Technique for High Resolution Ocean Navigation," J. Acoust. Soc. Am., 57, S56, 1975, whereby the locations of the moorings can more accurately be determined.

Since the present invention utilizes both pulse and Doppler tracking systems, the invention provides the absolute accuracy of a pulse system together with the relative accuracy of a Doppler system. The high resolution provided by the Doppler subsystem permits corrections to be applied to the positions determined by the pulse subsystem thereby to imporve the accuracy of the position determined by the pulse subsystem and since the pulse and Doppler subsystems are operated simultaneously, the positions of each can be compared to check the total system operation. Since the Doppler tracking portion of the system is initialized with a pulse system position, short time loss of the Doppler signal or signals can be tolerated since the current pulse determined position is available to reinitialize the Doppler position determination.

With respect to the quadrant counting system employed in this invention, same materially decreases the data input rate to the central processing unit and allows currently available central processing units or digital computers to be utilized to provide a real time display.

What is claimed is:

1. A high resolution underwater acoustic navigation system comprising, in combination:
    an object whose movement through water is to be tracked and a plurality of geographically fixed underwater devices;
    interrogation means on said object for periodically transmitting acoustic interrogation pulse tones and transponder means at each of said underwater devices for transmitting an acoustic tone burst in response to reception of an interrogation pulse tone, the tone burst transmitted by each transponder means being of a characteristic frequency different from all other tone burst frequencies;
    beacon means at each underwater device for continuously transmitting an acoustic tone, the continuous tone transmitted by each beacon means being of a characteristic frequency different from all other continuous tone frequencies;
    first receiver means at said object for determining the reception times of said tone bursts relative to said interrogation pulse;
    second receiver means at said object for determining the Doppler shifts of the acoustic tones as received from each underwater device; and
    computer means connected to said first and second receiver means for determining a reference position of said object based upon said reception times and then tracking movement of said object from said reference position based upon said Doppler shifts.

2. A high resolution navigation system as defined in claim 1 wherein said second receiver means comprises a separate channel for each continuous tone, each channel including a coherent phase detector providing sine and cosine baseband signals of the Doppler shifted component of a continuous tone, detector means detecting the instantaneous signs of said baseband signals for determining phase angle quadrant changes, counter means for accumulating the number of quadrant changes, and buffer means for periodically providing the computer means with data corresponding to the accumulated number of quadrant changes.

3. A high resolution navigation system as defined in claim 2 wherein said detector means comprises a sign detector for each baseband signal and a sign change detector connected to the outputs of both sign detectors.

4. A high resolution navigation system as defined in claim 2 wherein each channel includes a filter receiving each baseband signal and having a narrow bandwidth determining the maximum velocity of movement of the object which may be tracked.

5. A high resolution underwater acoustic navigation system comprising, in combination:
   underwater means for continuously transmitting a plurality of acoustic tones from different, fixed underwater locations and for periodically transmitting acoustic tone bursts from such locations, the continuous acoustic tone and the acoustic tone burst at each location being of frequencies which are different from each other and different from all frequencies transmitted from the other locations;
   first receiver means carried by an object whose position is to be tracked for receiving said acoustic tone bursts;
   central processor means connected to said first receiver means for periodically determining the position of said object relative to said locations on the basis of times of receptions of said acoustic tone bursts; and
   second receiver means carried by said object for receiving said continuous acoustic tones and providing Doppler shift components thereof due to movements of said object relative to said locations, said second receiver means being connected to said central processor means for providing real time tracking of the positions of said object in the time periods between and based upon the periodic positions determined from said acoustic tone bursts.

6. A high resolution underwater acoustic navigation system according to claim 5 including quarter-cycle counter means connected between said second receiver means and said central processor means for periodically providing the number of quarter cycles of said Doppler shift components to said central processor means.

7. A high resolution navigation system as defined in claim 5 wherein said second receiver means comprises a separate channel for each continuous tone, each channel including a coherent phase detector providing sine and cosine baseband signals of the Doppler shifted component of a continuous tone, detector means detecting the instantaneous signs of said baseband signals for determining phase angle quadrant changes, counter means for accumulating the number of quadrant changes, and buffer means for periodically providing the central processor means with data corresponding to the accumulated number of quadrant changes.

8. A high resolution navigation system as defined in claim 7 wherein said detector means comprises a sign detector for each baseband signal and a sign change detector connected to the outputs of both sign detectors.

9. A high resolution navigation system as defined in claim 7 wherein each channel includes a filter receiving each baseband signal and having a narrow bandwidth determining the maximum velocity of movement of the object which may be tracked.

10. A high resolution underwater acoustic navigation system comprising, in combination:
   a plurality of underwater means for continuously transmitting a plurality of acoustic tones from different, fixed underwater locations and for periodically transmitting acoustic tone bursts from such locations, the continuous acoustic tone and the acoustic tone burst at each location being of frequencies which are different from each other and different from all frequencies transmitted from the other locations;
   first means adapted to be carried by an object whose position is to be tracked for periodically determining the relative position of the object based upon the reception times of said tone bursts; and
   second means adapted to be carried by the object whose position is to be tracked for determining the movement of the object from said relative position based upon Doppler shift of said continuous acoustic tones.

* * * * *